(12) United States Patent
Xu et al.

(10) Patent No.: US 12,093,175 B2
(45) Date of Patent: *Sep. 17, 2024

(54) TECHNIQUES FOR INSTANCE STORAGE USING SEGMENT-BASED STORAGE

(71) Applicant: Lemon Inc., Grand Cayman (KY)

(72) Inventors: Peng Xu, Los Angeles, CA (US); Ping Zhou, Los Angeles, CA (US); Chaohong Hu, Los Angeles, CA (US); Fei Liu, Los Angeles, CA (US); Changyou Xu, Los Angeles, CA (US); Kan Frankie Fan, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 23 days.

This patent is subject to a terminal disclaimer.

(21) Appl. No.: 18/053,908

(22) Filed: Nov. 9, 2022

(65) Prior Publication Data

US 2024/0152455 A1    May 9, 2024

(51) Int. Cl.
*G06F 12/08* (2016.01)
*G06F 12/02* (2006.01)
*G06F 12/0804* (2016.01)

(52) U.S. Cl.
CPC ...... *G06F 12/0804* (2013.01); *G06F 12/0246* (2013.01); *G06F 12/0292* (2013.01); *G06F 2212/7201* (2013.01)

(58) Field of Classification Search
CPC ............. G06F 12/0804; G06F 12/0246; G06F 12/0292; G06F 2212/7201
USPC .......................................................... 711/118
See application file for complete search history.

(56) References Cited

U.S. PATENT DOCUMENTS

2022/0365715 A1* 11/2022 Horn ..................... G06F 3/0659

* cited by examiner

*Primary Examiner* — Hua J Song
(74) *Attorney, Agent, or Firm* — Astute IP Law Group

(57) ABSTRACT

Described are examples for storing data on a storage device, including storing, in a live write stream cache, one or more logical blocks (LBs) corresponding to a data segment, writing, for each LB in the data segment, a cache element of a cache entry that points to the LB in the live write stream cache, where the cache entry includes multiple cache elements corresponding to the multiple LBs of the data segment, writing, for the cache entry, a table entry in a mapping table that points to the cache entry, and when a storage policy is triggered for the cache entry, writing the multiple LBs, pointed to by each cache element of the cache entry, to a stream for storing as contiguous LBs on the storage device, and updating the table entry to point to a physical address of a first LB of the contiguous LBs on the storage device.

20 Claims, 9 Drawing Sheets

TECHNIQUES FOR INSTANCE STORAGE USING SEGMENT-BASED STORAGE

BACKGROUND

The described aspects relate to storage devices, such as not-AND (NAND) storage devices, and more particularly, to segment-based storage on storage devices.

In instance storage for bare metal storage devices or arrays of storage devices, compression can be used to improve system performance, quality-of-service (QoS), cost-efficiency, etc. For example, instance storage can be used in scenarios having multiple virtual machines accessing a same drive array (e.g., solid state drive (SSD) array) for storage. The instance storage can include multiple SSDs that can be combined for a single system storage that supports multiple virtual machines that can execute one or more servers, and can access the drive array via an interface card and associated firmware.

While compression can change user data size of an application, a mapping table can be used to maintain the mapping between original logical block addressing (LBA) (e.g., LBAs in instance storage) and a new physical location (e.g., LBAs in SSDs). Applications may access SSD array in smaller logical blocks (LBs), such as 4 kilobytes (KBs), and interface card firmware for the SSD array can maintain a 4 KB based logical-to-physical (L2P) mapping table. As SSD drive array capacity becomes larger, the L2P mapping table maintained by the interface card firmware can also increase in size. For example, a 16 terabyte (TB) SSD array may use at least 16 gigabyte (GB) dynamic random access memory (DRAM) to cache the L2P table. Having a large DRAM table can result in large cost of DRAM, more DRAM chips using a larger circuit layout, larger power consumption, which can result in SSD temperature, performance (power throttling).

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a method for instance storage using segment-based storage on a storage device is provided that includes storing, in a live write stream cache, one or more logical blocks corresponding to a data segment, writing, for each logical block in the data segment, a cache element of a cache entry that points to the logical block in the live write stream cache, wherein the cache entry includes multiple cache elements corresponding to the multiple logical blocks of the data segment, writing, for the cache entry, a table entry in a mapping table that points to the cache entry, and when a storage policy is triggered for the cache entry, writing the multiple logical blocks, pointed to by each cache element of the cache entry, to a stream for storing as contiguous logical blocks on the storage device, and updating the table entry to point to a physical address of a first logical block of the contiguous logical blocks on the storage device.

In another example, an apparatus for instance storage using segment-based storage on a storage device is provided where the apparatus includes a processor and a non-transitory memory with instructions thereon. The instructions upon execution by the processor, cause the processor to store, in a live write stream cache, one or more logical blocks corresponding to a data segment, write, for each logical block in the data segment, a cache element of a cache entry that points to the logical block in the live write stream cache, wherein the cache entry includes multiple cache elements corresponding to the multiple logical blocks of the data segment, write, for the cache entry, a table entry in a mapping table that points to the cache entry, and when a storage policy is triggered for the cache entry, write the multiple logical blocks, pointed to by each cache element of the cache entry, to a stream for storing as contiguous logical blocks on the storage device, and update the table entry to point to a physical address of a first logical block of the contiguous logical blocks on the storage device.

In another example, a non-transitory computer-readable storage medium storing instructions that when executed by a processor cause the processor to execute a method is provided. The method includes storing, in a live write stream cache, one or more logical blocks corresponding to a data segment, writing, for each logical block in the data segment, a cache element of a cache entry that points to the logical block in the live write stream cache, wherein the cache entry includes multiple cache elements corresponding to the multiple logical blocks of the data segment, writing, for the cache entry, a table entry in a mapping table that points to the cache entry, and when a storage policy is triggered for the cache entry, writing the multiple logical blocks, pointed to by each cache element of the cache entry, to a stream for storing as contiguous logical blocks on the storage device, and updating the table entry to point to a physical address of a first logical block of the contiguous logical blocks on the storage device.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

DETAILED DESCRIPTION

Figure 1:
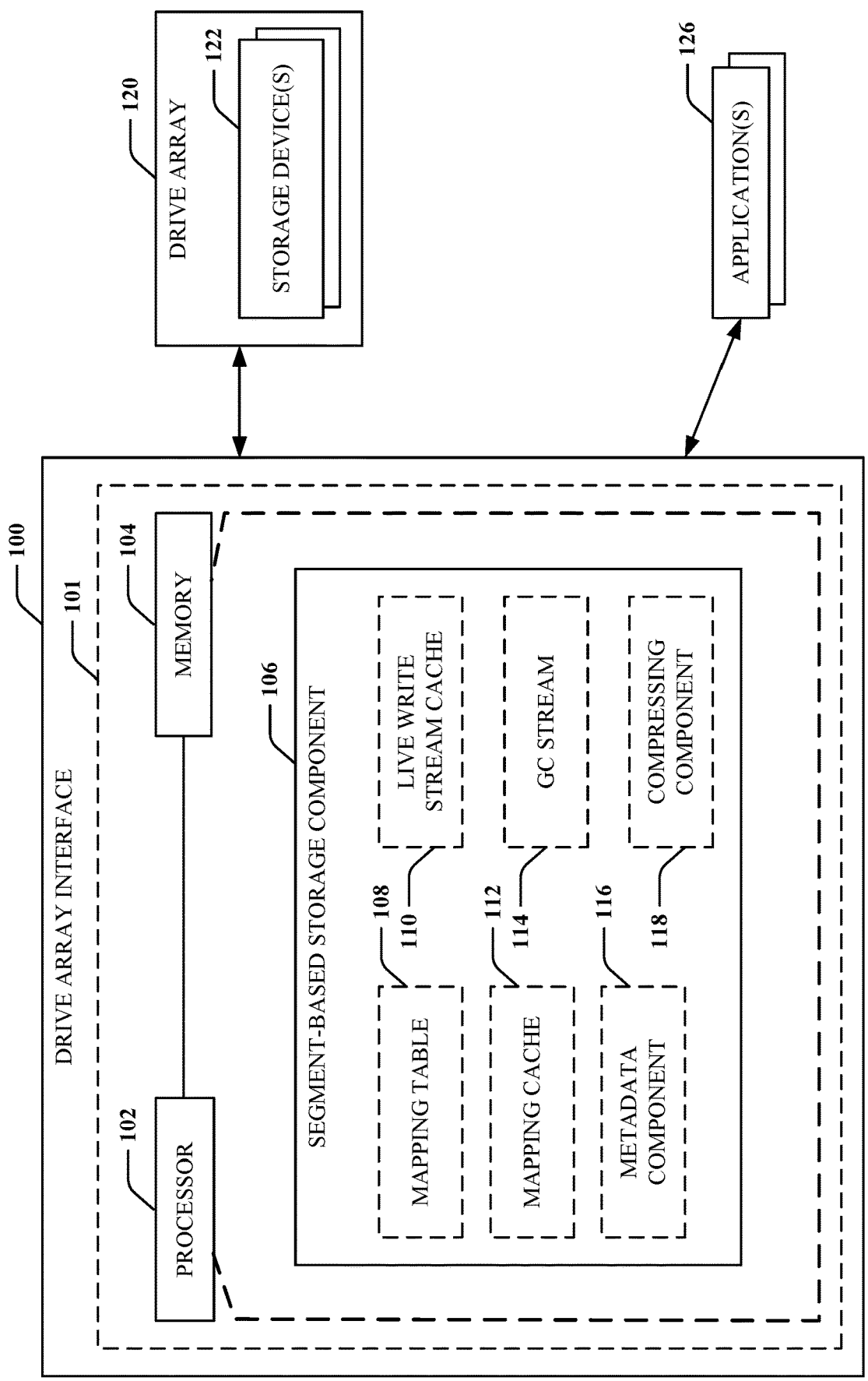
FIG. 1 is a schematic diagram of an example of a drive array interface for facilitating access to a drive array including multiple storage devices in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to providing segment-based storage for instance storage. Some solutions have included multiple layers L2P caching, where interface card firmware (FW) for a solid state drive (SSD) or SSD array can divide a whole L2P into several small regions, where each region is stored in NOT-AND (NAND) Flash. In such solutions, dynamic random access memory (DRAM) only can hold a second layer mapping (SLM), where each SLM entry can include a NAND physical address (NPA) of a small region. One issue may be that any access of LB can use two threads or processes: one for SLM, and one for logical block (LB). Also SLM may be dumped into NAND, which can result in write amplification (WA). SLM can be cached in DRAM and having extra logic for L2P caching check, while the management overhead is still large. This solution can be widely applied in client SSD as the access pattern of client market is localized so that cache hit rate is high.

Other solutions can include segment-based management where instead of managing mapping information on a LB size basis (e.g., 4 kilobyte (KB)), FW of the SSD interface card can manage logical-to-physical (L2P) mapping in larger granularity, such as 64 kilobyte (KB), which can reduce the size of (and thus resources used for managing) the L2P mapping table. The larger granularity collection of LBs can be referred to herein as a segment. For example, the capacity space of the SSD or SSD drive array can be divided into segments in larger granularity, such as 64 KB granularity, where each L2P entry can point to the start NPA of a segment. LBs in a segment can be physically contiguous so that during read, FW of the SSD interface card can determine the physical location of each LB by using a starting NPA of the segment (e.g., a NPA of a first LB in the segment) and an offset of the LB within the segment (e.g., Start_NPA+ AU_OFFSET). While a host can still access SSD in 4 KB granularity, if allocation unit (AU) is not full, FW can pad the AU, which can result in times of WA. When LB in an AU is updated, FW can do read modify write (RMW) operations, which will also result in times of WA.

In accordance with aspects described herein, segment-based management can be used for instance storage, where data segments can be formed by storing associated LBs in a live write stream cache (e.g., using append-only storage) and managed in a cache entry that points to LBs associated with a given data segment. A mapping table entry for the data segment can point to the cache entry to facilitate access to the data segment while in the live write stream cache. When a storage policy is triggered, the LBs in the live write stream cache can be written to a garbage collection (GC) stream in sequential order by data segment for storage in the drive array. The mapping table can be updated to point, for each data segment stored in the GC stream, to the first LB for the data segment as stored in the GC stream. In this regard, after the storage policy is triggered, access to the data segment is provided in the GC stream, and a given LB in the data segment can be located based on the address of the first LB of the data segment, as obtained from the mapping table entry, combined with an offset of the desired LB within the data segment.

Using the segment-based storage in this regard can facilitate reducing a size of the L2P mapping table (e.g., by a factor according to the number of LBs in a segment). In addition, using the live write cache stream can allow for append-only storage, and managing the live write cache stream with cache entries facilitates ordering of the LBs written to the live write cache stream for access and subsequent storage in the drive array, which can optimize accessing the LBs as being sequentially stored.

Figure 5:
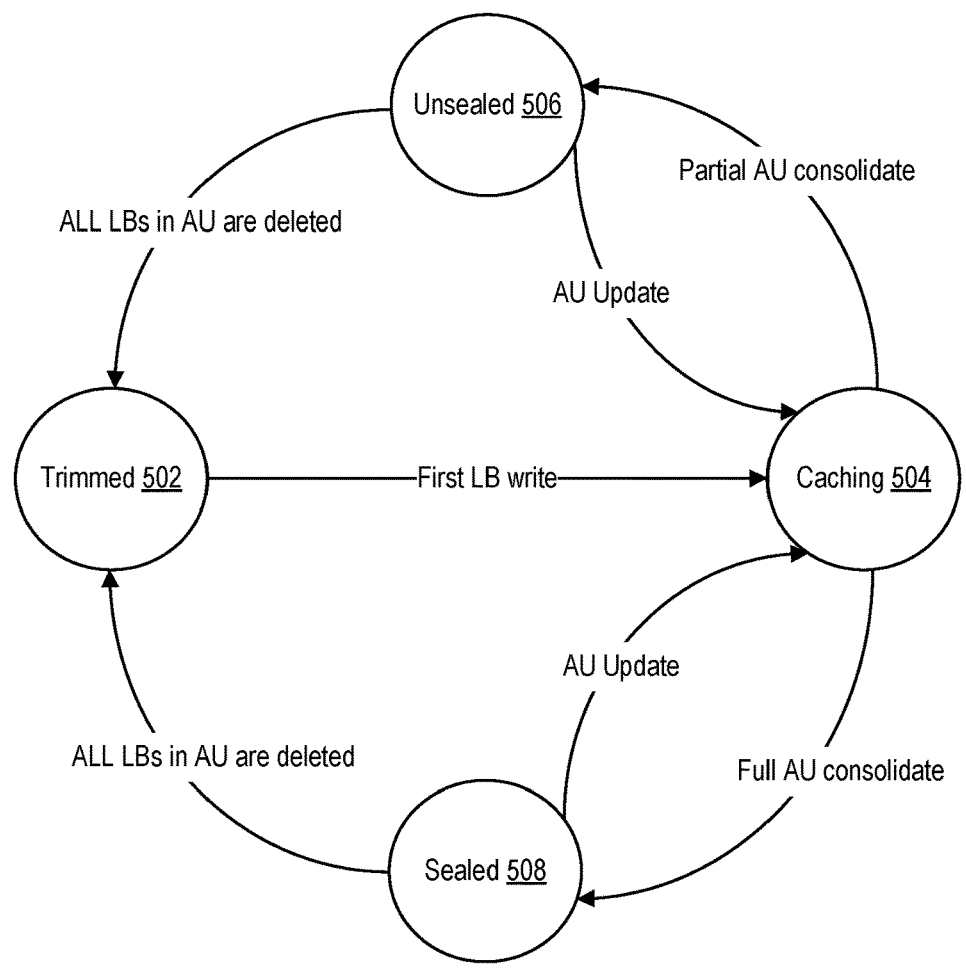
FIG. 5 illustrates an example of a state machine for a segment mapping table entry in accordance with aspects described herein.
Figure 6:
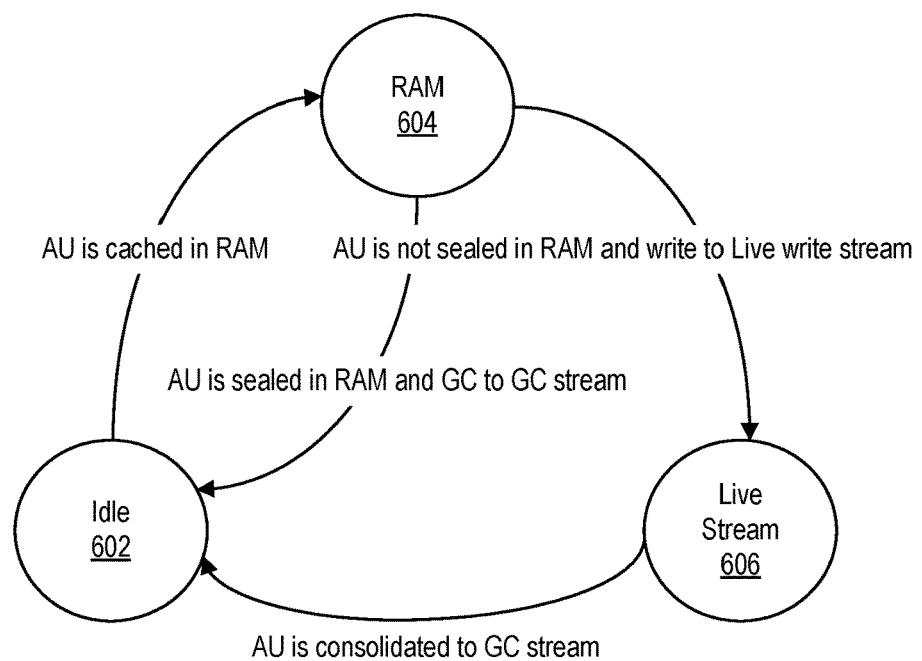
FIG. 6 illustrates an example of a state machine for a mapping cache cache entry in accordance with aspects described herein
Figure 7:
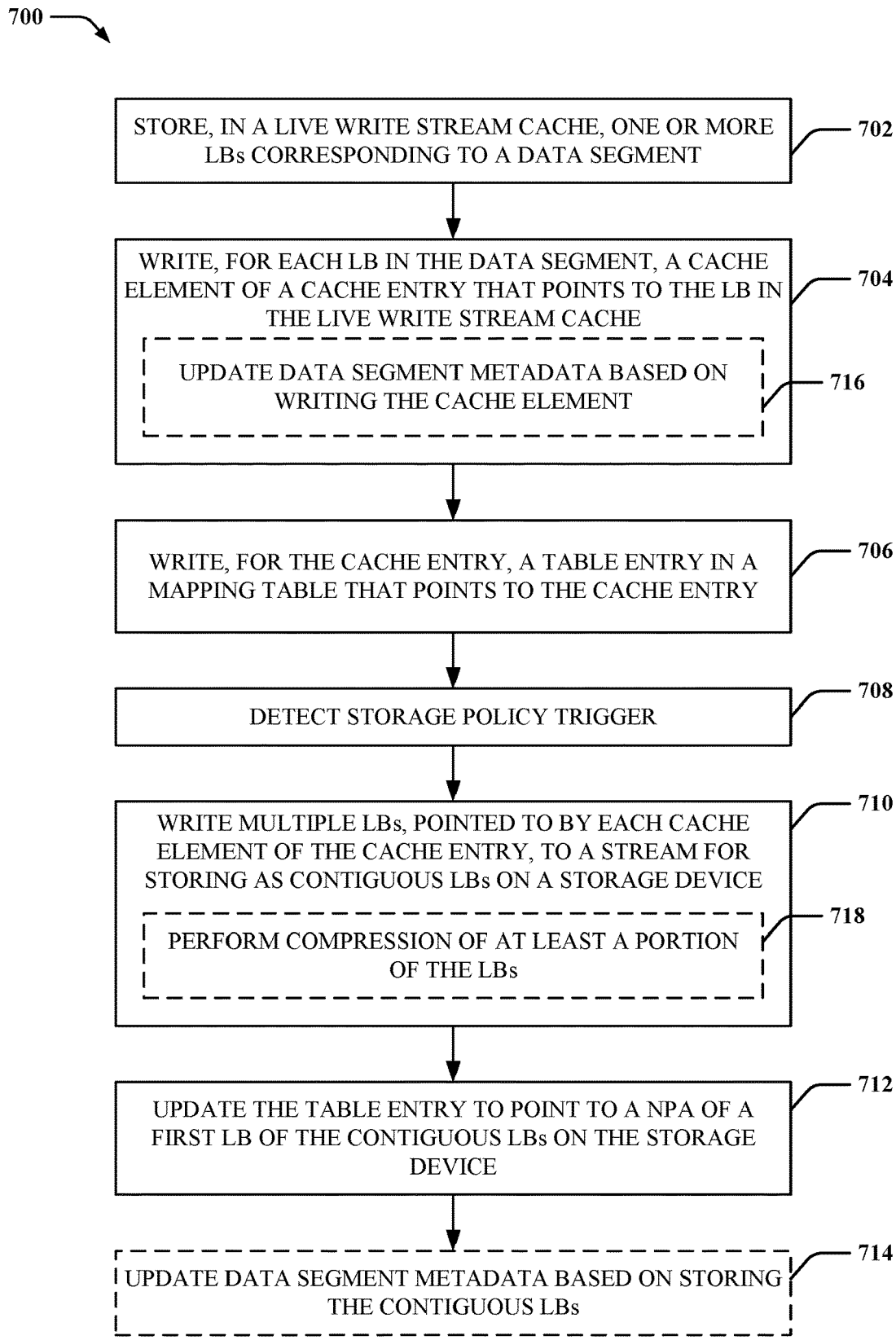
FIG. 7 is a flow diagram of an example of a method for writing data segments in a segment-based storage for instance storage in accordance with examples described herein.
Figure 8:
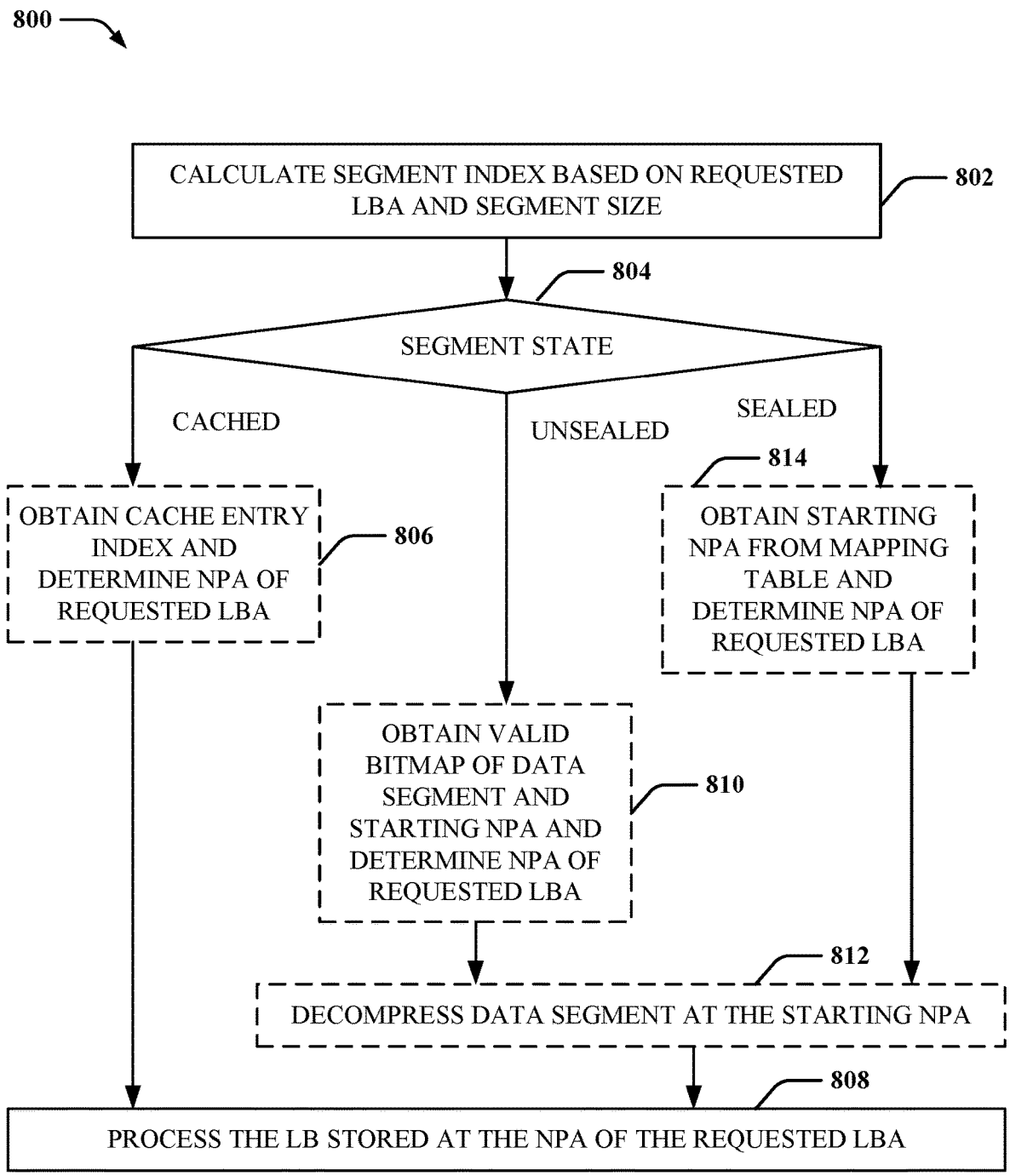
FIG. 8 is a flow diagram of an example of a method for processing data segments stored in a segment-based storage for instance storage in accordance with examples described herein.

Turning now to FIGS. 1-9, examples are depicted with reference to one or more components and one or more methods that may perform the actions or operations described herein, where components and/or actions/operations in dashed line may be optional. Although the operations described below in FIGS. 7 and 8 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a drive array interface 100 for facilitating access to a drive array 120 including multiple storage devices 122. For example, the storage devices 122 can include multiple SSDs, as described, which can be combined into a single system storage. The drive array interface 100 can facilitate mapping the multiple storage devices 122 as a single system storage by including logic or algorithms to resolve a physical LB address (LBAs) to a physical LB on one of the multiple storage devices 122. In one example, a physical LBA 0 can correspond to LB 0 on a first storage device, physical LBA 1 can correspond to LB 0 on a next storage device, etc., such that a physical LBA can be resolved to a storage device based on the physical LBA divided by the number of storage devices 122 in the drive array 120, and the physical LB on the storage device that is based on the physical LBA modulo the number of storage devices 122 in the drive array 120. This is just one specific example of combining storage devices 122 into a single system storage, and substantially any mechanism to combine the storage devices 122 is possible such that the drive array interface 100 can allocate physical LBAs and know how to resolve the physical LBA to the physical LB of a certain storage device in the drive array 120.

In an example, drive array interface 100 can provide one or more applications 126 with access to the drive array 120 for storing data, retrieving stored data, updating stored data, etc. For example, drive array interface 100 can include a processor 102 and/or memory 104 configured to execute or store instructions or other parameters related to providing a segment-based storage component 106. The processor 102 and/or memory 104 can be part of firmware on the drive array interface. In one example, drive array interface 100 can leverage processor 102 and/or memory 104 of a computing device that includes the drive array interface 100 to execute the drive array interface 100, associated firmware, associated functions and/or components described herein, etc. In one example, the drive array interface 100 can be coupled to an interface bus on a server, and can utilize the processor 102 and/or memory 104 of the server (e.g., alone or in conjunction with additional processing or memory resources of the drive array interface 100) to provide the functions and/or associated components described herein. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component 101), and/or the like. Memory 104 may store instructions, parameters, data structures, etc., for use/execution by processor 102 to perform functions described herein.

In an example, segment-based storage component 106 can facilitate storing data on the drive array 120 in data segments that are comprised of multiple LBs, which can effectively reduce the L2P mapping table size, as described above, by a factor of the number of LBs in a data segment. In one specific example, the LBs can be 4 KB and the data segment can be 64 KB, such that each data segment include 16 LBs, and the L2P mapping table can be reduced by a factor of 16. For example, segment-based storage component 106 can include a mapping table 108 for mapping NPAs of data segments to LBs on the drive array 120 or on the live write stream cache 110, as described herein. In an example, segment-based storage component 106 can include one or more of the live write stream cache 110 for writing LBs of data segment for storage as append-only, a mapping cache 112 including cache entries that point to the LBs in the live write stream cache 110 for a given data segment, a GC stream 114 for storing sequential LBs for one or more data segments for storing on the drive array 120, a metadata component 116 for storing and/or managing metadata associated with data segments stored via segment-based storage component 106, and/or a compressing component 118 for compressing LBs for storing in the GC stream 114.

Figure 2:
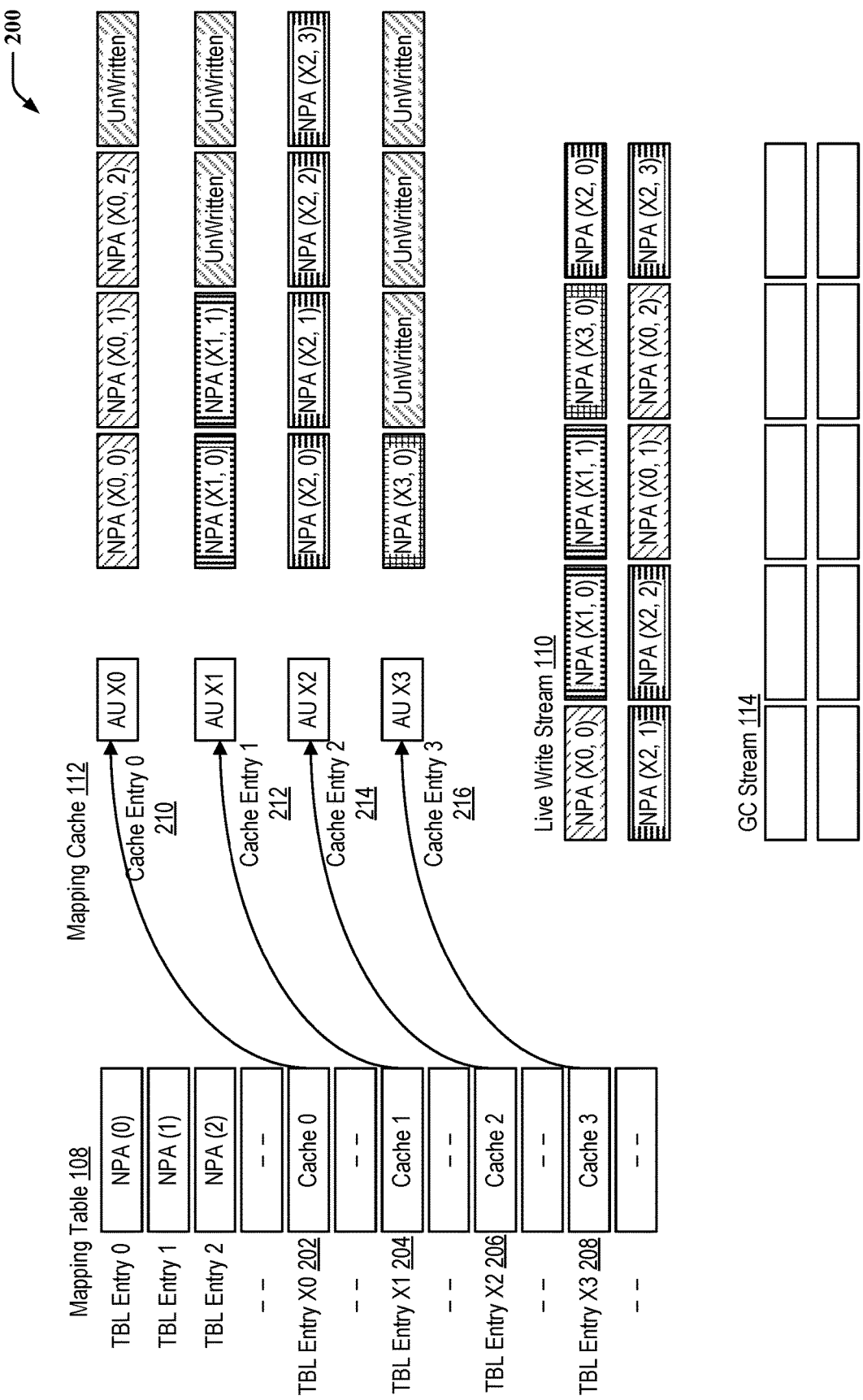
FIG. 2 illustrates an example of storage structures used by a segment-based storage component, in accordance with aspects described herein.

FIG. 2 illustrates an example of storage structures 200 used by a segment-based storage component 106, in accordance with aspects described herein. Storage structures 200 include representations of a mapping table 108, live write stream cache 110, mapping cache 112, GC stream 114, as described above and further herein. For example, multiple applications (e.g., applications 126) can write to the drive array 120 for storage. Drive array interface 100 can allocate storage locations for the applications 126 that are defined in mapping table 108. Drive array interface 100 can resolve mapping table entries in mapping table 108 to physical LBs of the storage devices 122 in the drive array 120, as described. The mapping table 108 can accordingly maintain a list of NPAs associated with data segments. In an example, the table entries in the mapping table 108 can be provided back to the applications 126, and each table entry can point to a NPA, which may include a physical LBA of a storage device 122 in the drive array 120, a location in a GC stream for storage in the drive array 120, a cache entry that points to a live write stream location, etc. In an example, live write stream cache 110 can include LBs received from the applications 126 for storage, where the LBs can include LBs to be associated as data segments and as certain table entries in the mapping table 108. Live write stream cache 110, however, may be append-only and random read storage, such that the LBs may not be received or stored sequentially in the live write stream cache 110. For example, multiple applications 126 can concurrently write to the drive array interface 100, and as such, live write stream cache 110 can include scattered LBs from the multiple applications. When LBs are written to the live write stream cache 110, segment-based storage component 106 can write a cache element of an associated cache entry to point to the live write stream cache 110 location of the LB, and can store, as the table entry in the mapping table 108 for the corresponding data segment, an address of the cache entry in the mapping cache 112.

For example, the segment-based storage component 106 can allocate locations for storing data segments to one or more applications 126 in table entry X0 202, table entry X1 204, table entry X2 206, and table entry X3 208. Based on allocating the locations or otherwise on receiving LBs for the allocated data segments, segment-based storage component 106 can update the corresponding mapping table entries to point to cache entries in mapping cache 112. For example, table entry X0 202 can point to cache entry 0 210, table entry X1 204 can point to cache entry 1 212, table entry X2 206 can point to cache entry 2 214, and table entry X3 208 can point to cache entry 3 216. As LBs are stored in live write stream cache 110, as received from the applications 126, the associated cache entries can be updated to have cache elements that point to the LBs in the live write stream cache 110. For example, when NPA (X0, 0) is stored in the live write stream cache 110, segment-based storage component 106 can update cache entry 0 210 to include a cache element that points to NPA (X0, 0) in the live write stream cache 110. Similarly, when NPA (X1, 0) is stored in the live write stream cache 110, segment-based storage component 106 can update cache entry 1 212 to include a cache element that points to NPA (X1, 0) in the live write stream cache 110, and so on.

In this example, if an application 126 requests to read, update, delete, etc. LBs associated with the data segment of table entry X0 202, segment-based storage component 106 can obtain the cache entry pointer from the table entry X0 202, determine which cache element in the cache entry 0 210 is associated with the requested LB, and determine to which LB in the live write stream cache 110 the cache element points. For example, for the LB of NPA (X0, 2) in the data segment of cache entry 0 210, segment-based storage component 106 can obtain an indication of the LB location in the live write stream cache 110 from the cache element in the cache entry 0 210 for NPA (X0, 2), and can obtain the LB for providing to the application 126. In one example, a storage policy can be triggered, which can result in live write stream cache 110 LBs being written to a GC stream 114 for storage. Examples are shown in FIGS. 3 and 4.

Figure 3:
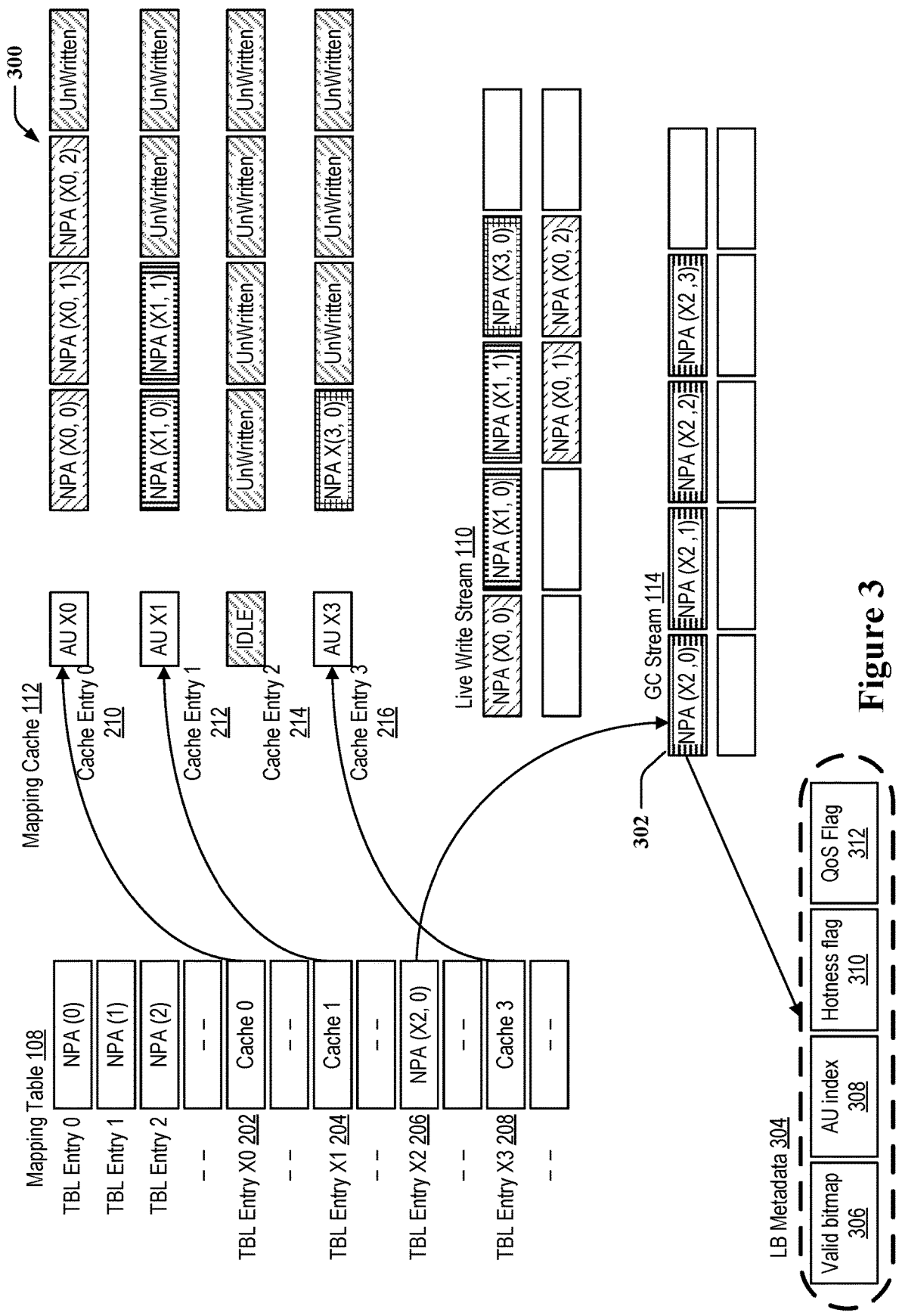
FIG. 3 illustrates an example of storage structures used by a segment-based storage component in storing logical blocks (LBs) of a data segment, in accordance with aspects described herein.
Figure 4:
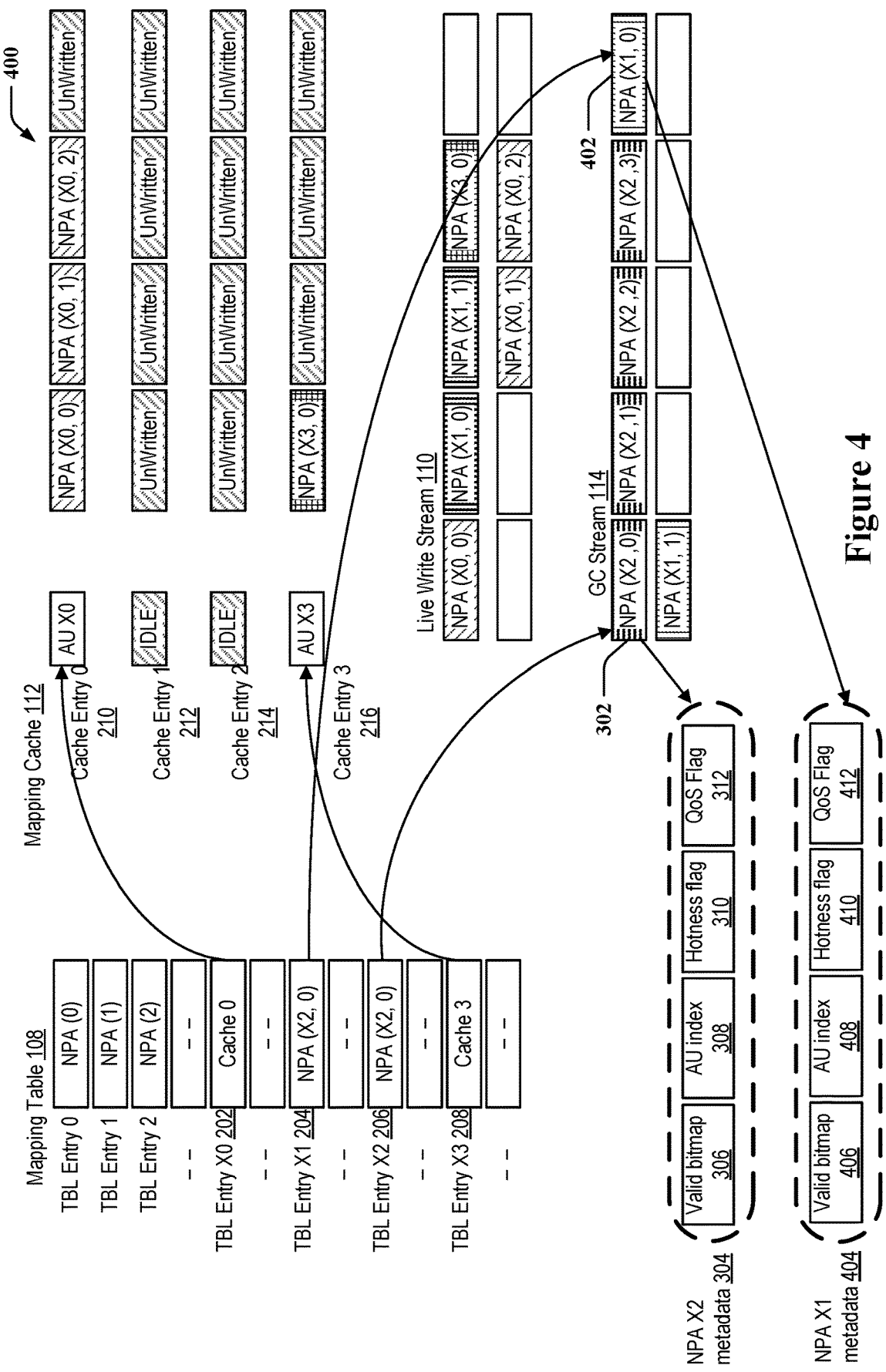
FIG. 4 illustrates an example of storage structures used by a segment-based storage component in storing logical blocks (LBs) of a first and a second data segment, in accordance with aspects described herein.

FIG. 3 illustrates an example of storage structures 300 used by a segment-based storage component 106 in storing LBs of a data segment, in accordance with aspects described herein. Storage structures 300 include representations of a mapping table 108, live write stream cache 110, mapping cache 112, GC stream 114, LB metadata 304 stored in a metadata component 116, as described above and further herein. In an example, storage structures 300 can be similar to storage structures 200 described in FIG. 2 above, and can include similar data as storage structures 200 until a storage policy for table entry X2 206 is triggered. For example, the storage policy can be triggered when all LBs for the data segment are received in live write stream cache 110 or based on other triggers, such as a request to store a certain data segments, or all data segments in the live write stream cache 110, or to otherwise flush the live write stream cache 110 and/or mapping cache 112, etc.

Based on the storage policy for table entry X2 206 being triggered, in an example, segment-based storage component 106 can read cache entry 2 214, based on the pointer to the cache entry 2 214 in table entry X2 206. For example, segment-based storage component 106 can obtain the cache elements of cache entry 2 214, each of which point to a LB location in live write stream cache 110 that includes an LB of the data segment (e.g., LB locations in live write stream cache 110 of NPA (X2, 0), NPA (X2, 1), NPA (X2, 2), NPA (X2, 3), shown in live write stream cache 110 FIG. 2 and as blank spaces in FIG. 3). In an example, segment-based storage component 106 can flush these LBs from the live write stream cache 110 sequentially into LBs of the GC stream 114, starting at LB 302. For example, this can include writing contents of the LBs (e.g., copying or moving) from the LBs of the live write stream cache 110 to the LBs in the GC stream 114 and/or deleting the contents of the LBs in the live write stream cache 110 that were copied or moved.

In an example, segment-based storage component 106 can store the LBs sequentially to facilitate efficient access of the LBs based on the location of the starting LB and the index, which can be managed for the data segment by the drive array interface 100, as described herein. In addition, when writing the LBs to the GC stream 114, metadata component 116 can write metadata for the data segment, which can include one or more of a valid bitmap 306 indicating which of the LBs of the data segment have valid data, an AU index 308 pointing to the starting location of the first LB of the data segment, a hotness flag 310 indicating whether the data stored in the data segment is hot, warm, cold, etc., which can be an indication of whether the data is relatively static or dynamic, a QoS flag 312 indicating a QoS associated with the data stored in the data segment, etc. In addition, for example, once the LBs are flushed to the GC stream, segment-based storage component 106 can delete or free data from cache entry 2 214, so the cache entry 2 214 can be reused for managing a subsequent data segment stored in live write stream cache 110. In yet another example, when writing LBs to the GC stream 114, compressing component 118 may perform compressing of the LBs to further optimize storage thereof, and the compressed LBs can be stored in the GC stream 114 for storing in drive array 120. This may result in a lesser number of LBs stored for a given data segment.

FIG. 4 illustrates an example of storage structures 400 used by a segment-based storage component 106 in storing LBs of a first and a second data segment, in accordance with aspects described herein. Storage structures 400 include representations of a mapping table 108, live write stream cache 110, mapping cache 112, GC stream 114, LB metadata 304 and 404 stored in a metadata component 116, as described above and further herein. In an example, storage structures 400 can be similar to storage structures 300 described in FIG. 3 above, and can include similar data as storage structures 300 until a storage policy for table entry X1 204 is triggered (e.g., after or at the same time as the storage policy for table entry X2 206).

Based on the storage policy for table entry X1 204 being triggered, in an example, segment-based storage component 106 can read cache entry 1 212, based on the pointer to the cache entry 1 212 in table entry X1 204. For example, segment-based storage component 106 can obtain the cache elements of cache entry 1 212, each of which point to a LB location in live write stream cache 110 that includes an LB of the data segment (e.g., LB locations in live write stream cache 110 of NPA (X1, 0) and NPA (X1, 1), shown in live write stream cache 110 FIG. 2 and as blank spaces in FIG. 4). In an example, segment-based storage component 106 can flush these LBs from the live write stream cache 110 sequentially into LBs of the GC stream 114, starting at LB 402, which can be a next LB after the last LB of another data segment (e.g., the data segment represented as table entry X2 206). For example, this can include writing contents of the LBs (e.g., copying or moving) from the LBs of the live write stream cache 110 to the LBs in the GC stream 114 and/or deleting the contents of the LBs in the live write stream cache 110 that were copied or moved.

In an example, segment-based storage component 106 can store the LBs sequentially to facilitate efficient access of the LBs based on the location of the starting LB and the index, which can be managed for the data segment by the drive array interface 100, as described herein. In addition, when writing the LBs to the GC stream 114, metadata component 116 can write metadata for the data segment, which can include one or more of a valid bitmap 406 indicating which of the LBs of the data segment have valid data, an AU index 408 pointing to the starting location of the first LB of the data segment, a hotness flag 410 indicating whether the data stored in the data segment is relatively static or dynamic, a QoS flag 412 indicating a QoS associated with the data stored in the data segment, etc. For example, the valid bitmap 306 for NPA X2 can be '1111' as all of the LBs for the data segment were written in the live write stream cache 110 with valid data, and the valid bitmap 306 for NPA X1 can be '1100' as the first two LBs for the data segment were written in the live write stream cache 110 with valid data. In addition, for example, once the LBs are flushed to the GC stream, segment-based storage component 106 can delete or free data from cache entry 1 212, so the cache entry 1 212 can be reused for managing a subsequent data segment stored in live write stream cache 110.

In the examples described above and further herein, segment-based storage can include dividing the whole instance storage into segments, where a segment can represent a user space sequential LBA range. A segment can be the minimum mapping management unit. An application can in place update any user-LBA randomly and read the LBAs in any granularity. In addition, for example, the drive array space (e.g., a nonvolatile memory express (NVMe) SSD or other SSD array media space) can be divided into contiguous ranges. A zone can include an append-only write, random read area (e.g., in zoned namespace (ZNS) SSD). For NVMe Conventional SSD, the zone can include a contiguous LBA range in one SSD. Two level mapping can be provided where LBs from different segments can first write in card on LB basis, and after sealed or after flush policy is triggered, LBs can be GC to sequential LBs and write into GC stream so that mapping info can be smaller. The examples described above and further here can also use GC to collect scattered LBs of a segment into sequential so that mapping info can be smaller. Compression can also be triggered during GC—e.g., compression can be a background activity and can compress cold data. In instance storage, data can be managed as a segment, where segment can be a fixed size (64 KB normally) and in place update written into SSD. On the storage card, segments can be written simultaneously, and an application can write data onto those segments in parallel. In this design, segment storage solution can be optimized for instance storage.

In an example, mapping table 108 can include, for each data segment, a segment index, which can be the table index, the entry of the segment table is the location of the segment data in the drive array 120 (or can be resolved to the drive array 120, as described above). For example, each table entry, as described, can point to either a mapping cache 112 cache entry or an NPA, which includes a NPA of the first (e.g., starting) LB of the segment. In the mapping table 108, each entry may specify a segment state (e.g., trimmed, caching, unsealed, sealed, as described further herein), and/or a segment entry, which may depend on the segment state. For example, for caching state, the segment state can include an index in the mapping cache 112 of the cache entry that corresponds to the data segment. For unsealed and sealed state, the segment state can include the first valid LB's NPA of an AU. For trimmed state, the segment state can include the trimmed type including all 0b1 trim, all OW trim, deterministic pattern trim, error report trim, unwritten, write unc, write zero for each LB. In this example, the segment state can be the state of the whole segment. For example, if partial segment is trimmed, the segment state is not trimmed. The GC process can help remove the trimmed LBs in a segment.

In an example, mapping cache 112 can include, for each cache entry, one or more of NPAs for LBs of an unsealed segment (unsealed can indicate that the whole data segment is not fully written), a segment index indicating the associated AU index (e.g., table entry index in the mapping table 108) of the cache entry, and/or a Next Ptr, which can be a pointer to manage the cache entries for cache policy.

The segment metadata generated for each data segment by the metadata component 116 (e.g., when the segment is moved to GC stream 114), such as metadata 304 and/or metadata 404, can be stored together with segment data onto NAND. The segment metadata can include one or more of a data segment index (e.g., the table entry index for sanity check and recovery), a valid bitmap to indicate which LBs in a data segment are valid, a QoS Flag that can be used by the storage policy (e.g., GC policy) to determine when to trigger storage, a hotness flag, which can be application assigned and used by the storage policy (e.g., GC policy) to determine when to trigger storage. In an example, a valid bitmap table can be referred for unsealed data segment accessing, where each bit represents the NPA associated with LB offset in the data segment, where 0 can indicate the associated LB is unwritten, 1 can indicate the associated LB is written or vice versa. A valid 0b1 count can match the LB count of a data segment stored in segment metadata. By using start NPA and valid bitmap, for example, the NPA for each valid LB in the AU can be determined. This data structure can be stored in DRAM or not. If valid bitmap is stored in DRAM, it can be used to find the requested LB's NPA. If valid bitmap is not stored in DRAM, the drive array interface 100 FW can read maximum LB count starting from start NPA and then use valid bitmap stored in segment metadata to figure out the requested LB's NPA, which may cause extra read amplification.

FIG. 5 illustrates an example of a state machine 500 for a segment mapping table 108 entry in accordance with aspects described herein. State machine 500 includes a trimmed state 502, a caching state 504, an unsealed state 506, and a sealed state 508 corresponding to a mapping table entry.

For example, in the trimmed state 502, the segment mapping table entry state, which can be used to mark the data segment, is unwritten. Each LB in this data segment's specific state can be specified in the state array. LB state can be: unwritten, write UNC, trimmed with 0 pattern, trimmed with deterministic pattern, trimmed with error report required. For example, in the caching state 504, the data segment can be cached in RAM or live write stream cache 110, and its associated LBs mapping info can be stored in mapping cache 112 entry. The drive array interface 100 (or corresponding FW) can refer to mapping cache 112 for cache state.

For example, in the unsealed state 506, when Segment is not fully written, drive array interface 100 (or corresponding FW) may consolidate it to GC stream 114 to release cache entry or release live write stream cache 110 or associated zone. The AU mapping table 108 entry can be in unseal state.

For example, in the sealed state 508, when the data segment is fully written, drive array interface 100 (or corresponding FW) can consolidate the AU to GC stream 114. This can be triggered when live write stream cache 110 is full, or mapping cache 112 is full, for example.

A given mapping table entry can start in the trimmed (unwritten) state 502. When an application or host first writes LBs to a data segment, the data segment states switch from trimmed to caching state 504. For example, the drive array interface 100 (or corresponding FW) can allocate a cache entry in the mapping cache 112 for the data segment and points the mapping table entry to that cache entry.

When LB mapping cache is full, the cache entry can be retired. If the data segment is fully written, drive array interface 100 (or corresponding FW) can consolidate the data segment to GC stream 114 and switch the data segment mapping state to sealed state 508. If the data segment is partially written, the AU state can be in the unsealed state 506. One difference between the sealed state 508 and the unsealed state 506 can be that for sealed state 508, by using start NPA, LB offset and bad block table, drive array interface 100 (or corresponding FW) can calculate any LBs in the data segment. For unsealed state 506, as there may be holes (e.g., unwritten LBs) in the consolidated data segment, drive array interface 100 (or corresponding FW) can obtain the valid bitmap for the data segment and can calculate the NPA of LB in the data segment. For example, compression can be applied during GC so that after GC, segment size might be smaller than 16 LBs (64 KB), a 4 bits length bit can be used to store the compressed length, or 64 KB can be read, but there may be a tradeoff between memory size and read amplification.

Sealed state 508 can switch to trimmed state 502 in some cases, such as if all LBs in a data segment become invalid. If partial data segment is trimmed or updated, the data segment can switch to caching state 504 with valid bitmap updated. RMW can be triggered to consolidate the data segment again. Unsealed state 506 can switch to trimmed state 502 if all LBs in the data segment become invalid. If partial data segment is trimmed or updated, the data segment can switch to caching state 504 with valid bitmap updated. RMW may be triggered to consolidate the data segment again. Decompression can be involved during RMW process.

FIG. 6 illustrates an example of a state machine 600 for a mapping cache 112 cache entry in accordance with aspects described herein. State machine 600 includes an idle state 602, a RAM state 604, and a live stream state 606. The cache entry can start from IDLE state 602, where LBs of a data segment can be first placed in RAM with associated buffer slot ID. After allocating by segment mapping table manager of the drive array interface 100 (or corresponding FW) or other process, the cache entry in the mapping cache 112 can be associated with a data segment (e.g., associated with a table entry in the mapping table 108).

The AU can be cached in the RAM state 604. In the RAM state 604, the LB's buffer slot ID can be placed into a cache element of the cache entry in the mapping cache 112 (e.g., into LB mapping info cache entry of the data segment). In this state, data of LBs of the data segment can be in RAM. When RAM cache is full, if segment is fully written, drive array interface 100 (or corresponding FW) can GC the data segment to GC stream, and the cache entry (or corresponding cache elements in the cache entry) can be released. If the data segment is not fully written, drive array interface 100 (or corresponding FW) can write the partial data segment into live write stream cache 110.

In the live stream state 606, segment data can be cached in live write stream cache 110. When the live write stream cache is full or the cache entry for the data segment (e.g., LB mapping info cache) is full, drive array interface 100 (or corresponding FW) can GC the data segment from live write stream cache to the GC stream 114 so that cache entry can switch to IDLE state 602 and release the cache entry information and/or corresponding cache elements.

The segment mapping table 108 and the mapping cache 112 can be mapping info that can be flushed onto NAND. A valid bitmap table can be used, or can be recovered after power on in background. Before valid bitmap is fully recovered, read amplification can occur by reading max for unsealed data segment, as described above.

In reference to the data segment states and writing LBs as described above, for open data segment write, segment-based storage component 106 can allocate a mapping cache 112 cache entry for append. When the data segment is sealed, segment-based storage component 106 can use a recycle engine to relocate LBs of a data segment to GC stream 114, and compressing component 118 may perform compression of the LBs during GC. After GC, segment data can be physically contiguous so segment-based storage component 106 can replace the table entry for the data segment (in mapping table 108) to point to the NPA of the data segment in the GC stream 114 or drive array 120, rather than the mapping cache 112 cache entry index. When mapping cache 112 is full, cache retire policy (weighted LRU) can be applied to release cache entries. In this case, even unsealed AUs can be recycled to GC stream 114. As some of LBs in an segment may be unwritten, valid bitmap can be accordingly updated, as described herein (e.g., to avoid padding the unwritten LBs with dummy data). Written LBs can be recycled into GC stream 114, and the mapping table 108 entry for the data segment can be updated to point to the NPA of the first valid LB of the data segment. During a read operation, for example, the requested LB can be located based on the first LB pointed to by the mapping table 108 entry and/or an offset of the requested LB.

FIG. 7 is a flowchart of an example of a method 700 for writing data segments in a segment-based storage for instance storage. For example, method 700 can be performed by a drive array interface 100 and/or one or more components thereof for storing data segments in a drive array 120.

In method 700, at action 702, one or more LBs corresponding to a data segment can be stored in a live write stream cache. In an example, segment-based storage component 106, e.g., in conjunction with processor 102, memory 104, etc., can store, in the live write stream cache 110, the one or more LBs correspond to the data segment. For example, one or more applications 126, which may be executing on a same or different computing device as the drive array interface 100, may request storage of data via the drive array interface 100. In this example, segment-based storage component 106 can determine to store the data in data segments, which can be larger in size than LBs of the storage devices 122 in the drive array 120 (and can comprise multiple LBs, as described herein). In one example, based on receiving a request for storage, drive array interface 100 can provide the application(s) 126 with a corresponding NPA used for, or otherwise associated with, storing the data segment. As described, the NPA can correspond to, or can be resolved to, an index of an entry in the mapping table 108.

In method 700, at action 704, a cache element of a cache entry that points to the LB in the live write stream cache can be written for each LB in the data segment. In an example, segment-based storage component 106, e.g., in conjunction with processor 102, memory 104, etc., can write, for each LB in the data segment, the cache element of the cache entry that points to the LB in the live write stream cache 110. For example, when segment-based storage component 106 stores an LB in the live write stream cache 110, it can determine to which data segment the LB belongs, which may be identified by a process requesting storage of the LB, an identifier in the LB, etc. In an example, segment-based storage component 106 can obtain the cache entry pointer from the mapping table 108 entry for the data segment, and can populate a cache element corresponding to the LB with an index into the live write stream cache 110 for the LB. For example, referring to FIG. 2, when LB for NPA (X1, 1) is stored in live write stream cache 110, segment-based storage component 106 can update the second cache element of cache entry 1 210 with the location in live write stream cache 110 of the LB for NPA (X1, 1).

In method 700, at action 706, a table entry in a mapping table that points to the cache entry can be written for the cache entry. In an example, segment-based storage component 106, e.g., in conjunction with processor 102, memory 104, etc., can write, for the cache entry, the table entry in the mapping table that points to the cache entry. For example, segment-based storage component 106 can write the table entry to point to the cache entry for all cache entries in the mapping cache 112 that have cache elements pointing to LBs in the live write stream cache 110. In one example, segment-based storage component 106 can write the table entries as pointers into the mapping cache 112 based on providing a table entry identifier to an application 126 for a data segment to be stored, or based on receiving a first LB for the data segment in the live write stream cache 110, etc. For example, referring to FIG. 2, segment-based storage component 106 can write the table entry 1 204 to point to cache entry 1 210 in the mapping cache 112. This process can continue for multiple LBs received in the live write stream cache 110.

At some point in time, at action 708, a storage policy trigger can be detected. In an example, segment-based storage component 106, e.g., in conjunction with processor 102, memory 104, etc., can detect the storage policy trigger. For example, the storage policy trigger may correspond to a specific data segment, or to the live write stream cache 110 in general, as described. In one example, the storage policy can related to, or be triggered by, filling all LBs allocated (or indicated a cache elements in the cache entry) for a data segment. In any case, based on detecting the storage policy trigger at action 708, at action 710, multiple LBs, pointed to be each cache element of the cache entry, can be written to a stream for storing as contiguous LBs on a storage device. In an example, segment-based storage component 106, e.g., in conjunction with processor 102, memory 104, etc., can write the multiple LBs, pointed to by each cache element of the cache entry, to the stream (e.g., GC stream 114) for storing as contiguous LBs on a storage device (e.g., a storage device 122 of drive array 120). For example, at least a portion of the multiple LBs associated with a cache entry may be in non-contiguous locations in the live write stream cache 110, and segment-based storage component 106 can write the multiple logical blocks, associated with the cache entry, from the live write stream cache 110 in a sequence corresponding to the order of the multiple cache elements as specified in the corresponding cache entry, as shown and described in reference to FIGS. 3 and 4 above.

In one example, the storage policy may include or otherwise be defined to free up cache entry and/or zones (referred to as Policy 1). For example, the storage policy can include GCing a zone with least valid LB in the live write stream cache 110. In another example, the storage policy can include GCing sealed data segments to prevent future RMW (referred to as Policy 2). If unsealed data segment is triggered because of running out of caches, segment-based storage component 106 can select the data segment with most LBs or the oldest unsealed data segment for GC (referred to as Policy 3). The foregoing policy inputs can be considered. When the drive array interface 100 determines critical capacity pressure state, the policies may be given weight for considering in performing GC (e.g., Policy 1 can have the highest weight). When the drive array interface 100 determines no critical capacity pressure, the policies (e.g., Policy 1, Policy 2, and Policy 3) can be considered using a weighted scoring scheme.

Based on the contiguous storage, for example, the data segment can be access by storing only a NPA of a first LB, as described herein, which can conserve space in the L2P table. Accordingly, at action 712, the table entry can be updated to point to a NPA of a first LB of the contiguous LBs on the storage device. In an example, segment-based storage component 106, e.g., in conjunction with processor 102, memory 104, etc., can update the table entry (e.g., in the mapping table 108) of the data segment to point to the NPA of the first LB of the contiguous LBs on the storage device (e.g., instead of to the cache entry).

In method 700, optionally at action 714, data segment metadata can be updated based on storing the contiguous LBs. In an example, metadata component 116, e.g., in conjunction with processor 102, memory 104, etc., can update data segment metadata for the data segment based on storing the contiguous LBs. For example, as described, metadata component 116 can update a valid bitmap to indicate which LBs in the data segment have valid data, can update a AU index to point to the table entry in the mapping table 108, can update a hotness flag or QoS flag based on application-specified parameters for the data stored in the data segment, etc. Metadata component 116 can update metadata for the data segment at other points in the process as well.

For example, in writing the cache element at action 704, optionally at action 716, data segment metadata can be updated based on writing the cache element. In an example, metadata component 116, e.g., in conjunction with processor 102, memory 104, etc., can update data segment metadata for the data segment based on writing the cache element. For example, as described, metadata component 116 can update a valid bitmap to indicate the LB corresponding to the cache element as having valid data. In other examples, metadata component 116 can update the data segment metadata when the table entry of the mapping table 108 is associated with the cache entry in the mapping cache 112. This update may include updating the AU index to point back to the mapping table 108 table entry, the hotness flag or QoS flag based on application-specified parameters for the data, etc.

In one example, in writing the multiple LBs to the stream for storing as contiguous LBs at action 710, optionally at action 718, compression of at least a portion of the LBs can be performed. In an example, compressing component 118, e.g., in conjunction with processor 102, memory 104, etc., can perform compression of at least a portion of the LBs. In one example, performing compression may be based on the hotness or QoS flag. For example, "cold" data that does not change very often can be compressed to save space, which may outweigh inefficiency that may be caused by having to infrequently decompress the data for reading (or modification or deletion, etc.).

In accordance with the above described storage schemes, the drive array interface 100 can include multiple layers of media for storing data. For example, drive array interface 100 can include SRAM/DRAM, which can be volatile memory that can be flushed when power loss happens so that the size cannot be large (e.g., 8 MB). In an example, host write LBs can be flushed, and GC data may not need to be flushed in SRAM. In addition, drive array interface 100 can include data in the live write stream cache 110, which can include NAND media used to hold up live write data segments. For example, after SRAM buffer is full, data can be flushed to live write stream cache 110 if the Segment is not sealed. As this stream is used to hold incoming write data for data segment consolidation, data on it can be considered hot so that single-level cell (SLC)/multi-level cell (MLC) mode can be used, which can lower WA and improve performance. AU may not need to be consolidated immediately after sealing, for hot data segment, if it is deleted before consolidating it to GC stream, this data segment may not be written to GC stream. In addition, drive array interface 100 can include the GC stream 114, where a consolidated data segment can be written onto this stream. Data segments on this stream can be relatively cold so that quad-level cell (QLC) can be used to store GC stream, or triple-level cell (TLC) can be used for GC stream, and another cold stream can be used for cold data, which can be in QLC mode. In addition, drive array interface 100 can include a cold stream, which can be a QLC stream that uses QLC mode to store cold data.

FIG. 8 is a flowchart of an example of a method 800 for processing data segments stored in a segment-based storage for instance storage. For example, method 800 can be performed by a drive array interface 100 and/or one or more components thereof for processing data segments stored in a drive array 120.

In method 800, at action 802, a segment index can be calculated based on a requested LBA and segment size. In an example, segment-based storage component 106, e.g., in conjunction with processor 102, memory 104, etc., can calculate the segment index based on the requested LBA and segment size. For example, this can be in response to a request to process a data segment stored in the instance storage. For example, the request can correspond to reading the data segment or a LB thereof, updating the data segment or a LB thereof, modifying the data segment or a LB thereof, deleting a data segment or a LB thereof, etc. In any case, a requested LBA can be specified, which can include a starting LB index and/or an offset. In an example, segment-based storage component 106 can determine the segment index of the data segment in the mapping table 108 based on the requested LBA and the segment size (e.g., the number of LB s in a segment).

After locating the segment, at action 804, the segment state can be determined. In an example, metadata component 116, e.g., in conjunction with processor 102, memory 104, etc., can determine the segment state. For example, segment-based storage component 106 can obtain the metadata for the data segment, which can include the segment state, as described above.

For example, where the segment state is cached, optionally at action 806, a cache entry index can be obtained and NPA of the requested LBA can be determined from the cache entry. In an example, for data segments in the cached state, segment-based storage component 106, e.g., in conjunction with processor 102, memory 104, etc., can obtain the cache entry index from the table entry for the data segment index in the mapping table 108, and can determine the NPA of the requested LBA based on determining the cache element for the requested LBA in the cache entry in the mapping cache 112. For example, the NPA may point to the live write stream cache 110 in this example. Once the data is obtained, at action 808, the LB stored at the NPA of the requested LBA can be processed. In an example, for data segments in the cached state, segment-based storage component 106, e.g., in conjunction with processor 102, memory 104, etc., can process the LB stored at the NPA of the requested LBA.

For example, where the segment state is unsealed, optionally at action 810, a valid bitmap and a starting NPA of the data segment can be obtained and NPA of the requested LBA can be determined at the starting NPA and based on the valid bitmap. In an example, for data segments in the unsealed state, segment-based storage component 106, e.g., in conjunction with processor 102, memory 104, etc., can obtain the valid bitmap from metadata and the starting NPA from the table entry in the mapping table 108 for the data segment. Based on the valid bit index, for example, segment-based storage component 106 can map the requested LBA to a valid LB in the data segment, and can obtain the LB for processing at action 808.

In one example, optionally at action 812, the data segment can be decompressed at the starting NPA before processing. In an example, for compressed data segments, compressing component 118, e.g., in conjunction with processor 102, memory 104, etc., can decompress the data segment starting at the NPA, and then can process the LB indicated by the requested LBA from the decompressed data.

For example, where the segment state is sealed, optionally at action 814, a starting NPA of the data segment can be obtained from the mapping table and NPA of the requested LBA can be determined. In an example, for data segments in the sealed state, segment-based storage component 106, e.g., in conjunction with processor 102, memory 104, etc., can obtain the starting NPA from the mapping table, as the data segment is completely contiguously stored, and can determine the NPA of the requested LBA starting at the starting NPA. For example, segment-based storage component 106 can map the requested LBA to the LB in the data segment, which may be based on an offset of the LB in the data segment, and can obtain the LB for processing at action 808.

Figure 9:
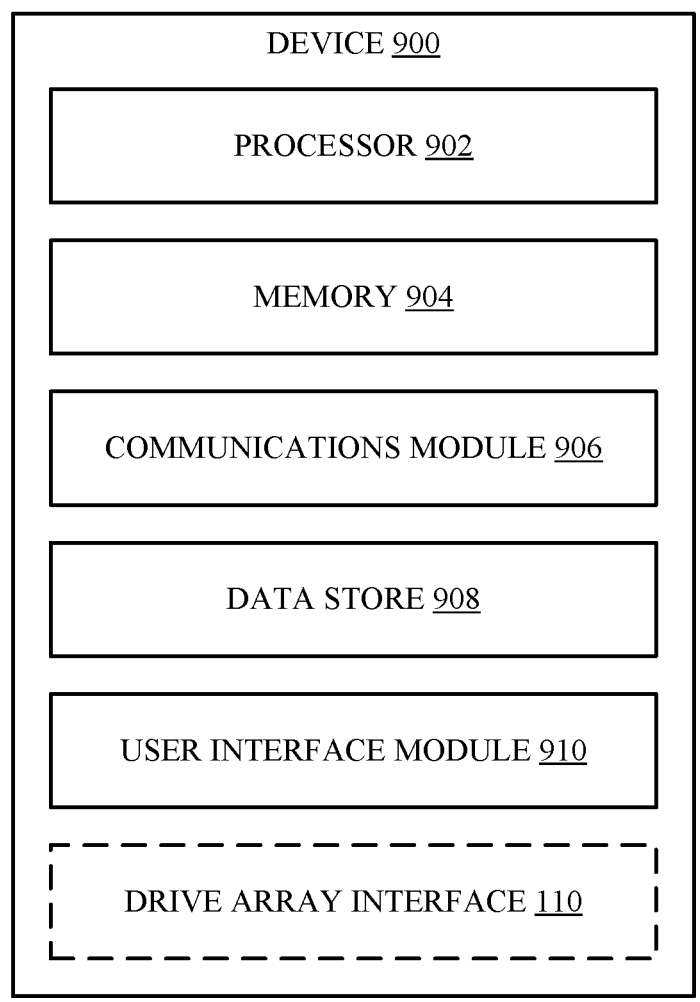
FIG. 9 is a schematic diagram of an example of a device for performing functions described herein.

FIG. 9 illustrates an example of device 900, including additional optional component details as those shown in FIG. 1. In one implementation, device 900 may include processor 902, which may be similar to processor 102 for carrying out processing functions associated with one or more of components and functions described herein. Processor 902 can include a single or multiple set of processors or multi-core processors. Moreover, processor 902 can be implemented as an integrated processing system and/or a distributed processing system.

Device 900 may further include memory 904, which may be similar to memory 104 such as for storing local versions of applications being executed by processor 902, such as drive array interface 100, etc. Memory 904 can include a type of memory usable by a computer, such as random access memory (RAM), read only memory (ROM), tapes, magnetic discs, optical discs, volatile memory, non-volatile memory, and any combination thereof.

Further, device 900 may include a communications module 906 that provides for establishing and maintaining communications with one or more other devices, parties, entities, etc., utilizing hardware, software, and services as described herein. Communications module 906 may carry communications between modules on device 900, as well as between device 900 and external devices, such as devices located across a communications network and/or devices serially or locally connected to device 900. For example, communications module 906 may include one or more buses, and may further include transmit chain modules and receive chain modules associated with a wireless or wired transmitter and receiver, respectively, operable for interfacing with external devices.

Additionally, device 900 may include a data store 908, which can be any suitable combination of hardware and/or software, that provides for mass storage of information, databases, and programs employed in connection with implementations described herein. For example, data store 908 may be or may include a data repository for applications and/or related parameters (e.g., drive array interface 100, etc.) not currently being executed by processor 902. In addition, data store 908 may be a data repository for drive array interface 100, such as a drive array 120, one or more storage devices 122, etc., and/or one or more other modules of the device 900.

Device 900 may include a user interface module 910 operable to receive inputs from a user of device 900 and further operable to generate outputs for presentation to the user. User interface module 910 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface module 910 may include one or more output devices, including but not limited to a display, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for instance storage using segment-based storage on a storage device, comprising:
    storing, in a live write stream cache, one or more logical blocks corresponding to a data segment;
    writing, for each logical block in the data segment, a cache element of a cache entry that points to the logical block in the live write stream cache, wherein the cache entry includes multiple cache elements corresponding to the multiple logical blocks of the data segment;
    writing, for the cache entry, a table entry in a mapping table that points to the cache entry; and
    when a storage policy is triggered for the cache entry:
        writing the multiple logical blocks, pointed to by each cache element of the cache entry, to a stream for storing as contiguous logical blocks on the storage device; and
        updating the table entry to point to a physical address of a first logical block of the contiguous logical blocks on the storage device.

2. The computer-implemented method of claim 1, wherein the storage policy is triggered by filling each of the multiple logical blocks of a data segment.

3. The computer-implemented method of claim 1, wherein storing the one or more logical blocks includes concurrently storing, using an append-only write operation, multiple logical blocks corresponding to one of the data segment or multiple data segments including the data segment.

4. The computer-implemented method of claim 1, wherein at least a portion of the multiple logical blocks associated with a cache entry are in non-contiguous locations in the live write stream cache, and wherein writing the multiple logical blocks to the stream includes writing the multiple logical blocks, associated with the cache entry, from the live write stream cache in a sequence corresponding to an order of the multiple cache elements in the cache entry.

5. The computer-implemented method of claim 4, wherein the cache element for a given logical block indicates the physical address of the first logical block and an offset of the given logical block in the contiguous logical blocks, and wherein writing the multiple logical blocks to the stream in the sequence is based on, for each logical block of the multiple logical blocks, the physical address of the first logical block and the offset indicated in the cache element for the logical block.

6. The computer-implemented method of claim 1, wherein the table entry includes a segment state of the data segment as one of trimmed, caching, unsealed, or sealed.

7. The computer-implemented method of claim 1, further comprising performing compression of the contiguous logical blocks on the stream.

8. The computer-implemented method of claim 1, wherein the live write stream is provided by an interface card that facilitates accessing the storage device.

9. The computer-implemented method of claim 1, wherein the data segment includes a user space sequential logical block address range of the storage device.

10. The computer-implemented method of claim 1, further comprising processing one or more requested logical blocks for the data segment after written to the live write stream cache or after written to the stream for storing with contiguous logical blocks, including:
    obtaining a segment state for the one or more requested logical blocks; and
    processing, based on the segment state, the one or more requested logical blocks from the live write stream cache or the stream.

11. The computer-implemented method of claim 10, wherein when the segment state is cached, processing the one or more requested logical blocks includes:
    obtaining a cache entry index for the data segment;
    determining, from a cache element of the cache entry corresponding to the cache entry index, a physical address of the one or more requested logical blocks in the live write stream cache; and
    processing the one or more requested logical blocks stored at the physical address in the live write stream cache.

12. The computer-implemented method of claim 10, wherein when the segment state is unsealed, processing the one or more requested logical blocks includes:
    obtaining a valid bitmap in metadata for the data segment;

determining, from a starting physical address of a first logical block in the data segment and the valid bitmap, a physical address of the one or more requested logical blocks in the stream; and processing the one or more requested logical blocks stored at the physical address in the stream.

13. The computer-implemented method of claim 12, further comprising decompressing the data segment before processing the one or more requested logical blocks.

14. The computer-implemented method of claim 10, wherein when the segment state is sealed, processing the one or more requested logical blocks includes:

determining, from a starting physical address of a first logical block in the data segment, a physical address of the one or more requested logical blocks in the stream; and processing the one or more requested logical blocks stored at the physical address in the stream.

15. The computer-implemented method of claim 14, further comprising decompressing the data segment before processing the one or more requested logical blocks.

16. An apparatus for instance storage using segment-based storage on a storage device, the apparatus comprising a processor and a non-transitory memory with instructions thereon, wherein the instructions upon execution by the processor, cause the processor to:

store, in a live write stream cache, one or more logical blocks corresponding to a data segment;

write, for each logical block in the data segment, a cache element of a cache entry that points to the logical block in the live write stream cache, wherein the cache entry includes multiple cache elements corresponding to the multiple logical blocks of the data segment;

write, for the cache entry, a table entry in a mapping table that points to the cache entry; and when a storage policy is triggered for the cache entry:

write the multiple logical blocks, pointed to by each cache element of the cache entry, to a stream for storing as contiguous logical blocks on the storage device; and update the table entry to point to a physical address of a first logical block of the contiguous logical blocks on the storage device.

17. The apparatus of claim 16, wherein the storage policy is triggered by filling each of the multiple logical blocks of a data segment.

18. The apparatus of claim 16, wherein the instructions cause the processor to concurrently store, using an append-only write operation, multiple logical blocks corresponding to one of the data segment or multiple data segments including the data segment.

19. The apparatus of claim 16, wherein at least a portion of the multiple logical blocks associated with a cache entry are in non-contiguous locations in the live write stream cache, and wherein the instructions cause the processor to write the multiple logical blocks, associated with the cache entry, from the live write stream cache in a sequence corresponding to an order of the multiple cache elements in the cache entry.

20. A non-transitory computer-readable storage medium storing instructions that when executed by a processor cause the processor to execute a method, wherein the method comprises:

storing, in a live write stream cache, one or more logical blocks corresponding to a data segment;

writing, for each logical block in the data segment, a cache element of a cache entry that points to the logical block in the live write stream cache, wherein the cache entry includes multiple cache elements corresponding to the multiple logical blocks of the data segment;

writing, for the cache entry, a table entry in a mapping table that points to the cache entry; and when a storage policy is triggered for the cache entry:

writing the multiple logical blocks, pointed to by each cache element of the cache entry, to a stream for storing as contiguous logical blocks on a storage device; and updating the table entry to point to a physical address of a first logical block of the contiguous logical blocks on the storage device.

* * * * *